United States Patent [19]

Takasaki et al.

[11] 4,004,253
[45] Jan. 18, 1977

[54] VARIABLE EQUALIZER

[75] Inventors: Yoshitaka Takasaki, Tokorozawa; Narimichi Maeda, Kodaira; Jun'ichi Nakagawa, Saitama; Kohei Ishizuka; Yasuhiro Kita, both of Hachioji, all of Japan

[73] Assignee: Hitachi, Ltd., Japan

[22] Filed: June 18, 1975

[21] Appl. No.: 587,894

[30] Foreign Application Priority Data

June 21, 1974 Japan .................. 49-70239
July 5, 1974 Japan .................. 49-76380

[52] U.S. Cl. .................. 333/28 R; 307/295; 330/107; 330/151
[51] Int. Cl.² .................. H03H 7/14
[58] Field of Search .................. 333/18, 28 R, 80 T; 330/107, 109, 151; 307/262, 295

[56] References Cited

UNITED STATES PATENTS

| | | | |
|---|---|---|---|
| 2,981,892 | 4/1961 | Franks et al. | 333/28 R X |
| 3,284,620 | 11/1966 | Lerman | 330/151 X |
| 3,551,854 | 12/1970 | Endo et al. | 333/28 R |
| 3,624,539 | 11/1971 | Kao et al. | 333/28 R X |
| 3,691,485 | 9/1972 | Borsuk et al. | 333/28 R X |

*Primary Examiner*—Paul L. Gensler
*Attorney, Agent, or Firm*—Craig & Antonelli

[57] ABSTRACT

An inductorless variable equalizer comprises input and output terminals. A first transmission network is situated in the forward path between the input and output terminals and has a variable transfer coefficient; second and third transmission networks are situated in the feedback and feedforward paths, respectively, between the input and output terminals. Each of these networks has a fixed transfer coefficient and the transfer coefficients of the feedback and feedforward networks having polarities opposite each other.

25 Claims, 19 Drawing Figures

VARIABLE EQUALIZER

This invention relates to a variable equalizer having a variable transfer characteristic which compensates for the deviation of a transmission characteristic in a transmission path in the field of electrical communications.

In the field of wire transmission systems using a coaxial cable or a cable pair, it is necessary to compensate for the deviation of the transmission characteristic through the cable caused by differences in the section length of the cables or caused by variations in the ambient temperature. In order to compensate for such a deviation, a Bode type variable equalizer is often used. In this type of variable equalizer, a variable transmission characteristic is obtained by adjusting a variable resistor. However, it is difficult to fabricate this type variable equalizer in the form of a semiconductor integrated circuit because of the inevitable use of inductors.

SUMMARY OF THE INVENTION

An object of the present invention is to provide a variable equalizer suitable for fabrication in the form of a semiconductor integrated circuit.

In order to realize such an object, the present invention is characterized by an inductorless variable equalizer comprising a first transmission network connected between input and output terminals and having a variable transfer coefficient, and second and third transmission networks provided in the feedback and feedforward paths between the input and output terminals, each of the second and third transmission networks having a fixed transfer coefficient.

BRIEF DESCRIPTION OF THE DRAWINGS

FIG. 4 is a diagram showing an embodiment of the detailed structure of the variable equalizer shown in FIG. 3a;

FIG. 7 is a diagram showing the detailed structure of another embodiment of the variable equalizer in FIG. 3a;

DETAILED DESCRIPTION

Figure 1:
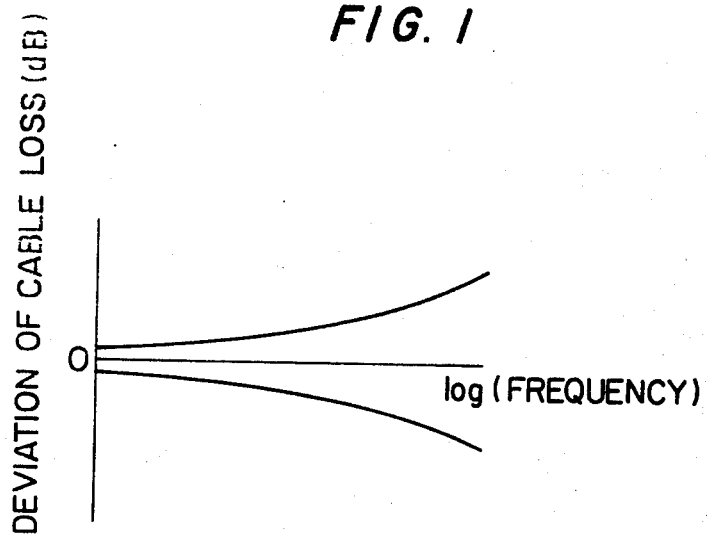
FIG. 1 is a characteristic diagram showing the relationship between frequency and the deviation of cable loss from a reference characteristic.

FIG. 1 represents a transmission characteristic showing the relation between frequency and the deviation of cable loss from a reference characteristic at a standard ambient temperature and/or a standard section length in wire transmission systems. The upper curve represents the deviation of cable loss at a higher ambient temperature and/or a longer section length, and the lower curve represents the deviation of cable loss at a lower ambient temperature and/or a shorter section length. FIG. 1 indicates that the deviation of the cable loss due to the variation of ambient temperature, etc. are symmetrical about the reference characteristic having a deviation of zero.

Figure 2:
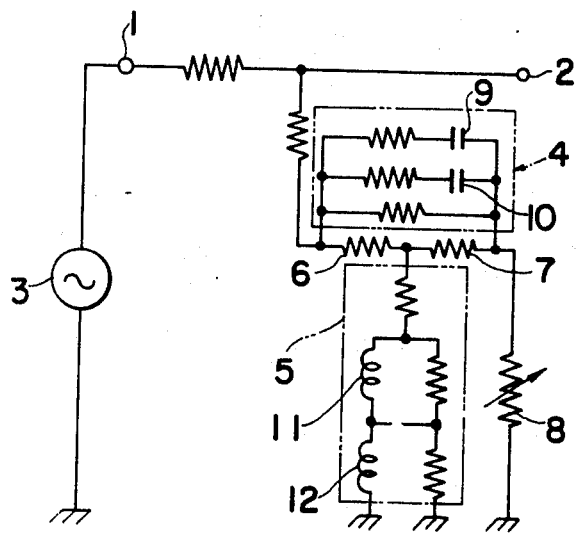
FIG. 2 is a diagram showing a conventional variable equalizer.

FIG. 2 shows a conventional variable equalizer of Bode type which compensates for the deviation of a characteristic as shown in FIG. 1.

In FIG. 2, the input and output terminals 1 and 2, respectively, are connected to a signal source 3 and to an output resistor (not shown in FIG. 2). Between the input and output terminals 1 and 2, there is connected a circuit comprising one-port networks 4 and 5, fixed resistors 6 and 7 and a variable resistor 8. Adjustment of the variable resistor 8 changes the voltage at the output terminal 2.

Since a constant resistance network is constituted by the one-port networks 4 and 5, and the fixed resistors 6 and 7, the one-port networks 4 and 5 form circuits inverse with respect to each other.

Therefore, when one-port network 4 includes capacitors 9 and 10, one-port network 5 necessarily includes inductors 11 and 12.

In conventional variable equalizers, fabrication of a semiconductor integrated circuit is difficult since the above-mentioned inductors must be used. Therefore, it is difficult to obtain a compact variable equalizer.

DETAILED DESCRIPTION OF THE INVENTION

FIGS. 3a, 3b, 3c and 3d show the fundamental structure of variable equalizers according to this invention.

In these FIGS., 13, 14 and 15 represent transmission networks, each of which comprises a one-port, a two-port or a two-port network with a common grounded terminal. These transmission networks 13, 14 and 15 are situated in the forward, feedback and feedforward paths, respectively, between the input and output terminals 1 and 2. The transfer coefficients of networks 14 and 15 in the feedback and feedforward paths have mutually opposite polarities.

Figure 3A:
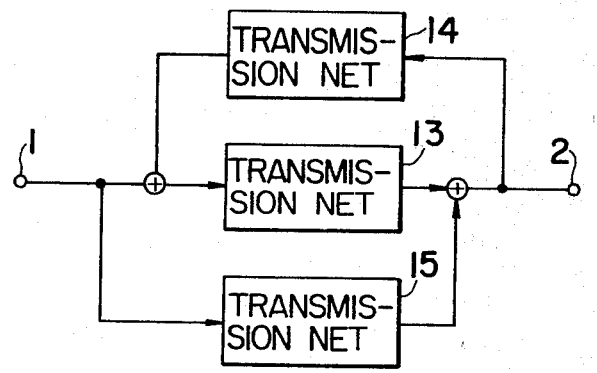
FIGS. 3a through 3d are signal flow diagrams showing embodiments of the fundamental structure of variable equalizers according to the invention.
Figure 3B:
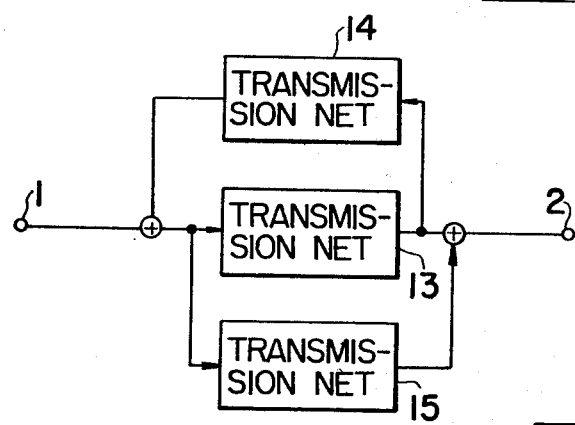

In FIGS. 3a to 3d, it is assumed that the transfer coefficients of the networks 13, 14 and 15 are X (jw), Y (jw) and Y' (jw), respectively. The transfer function H (jw) between the input and output terminals 1 and 2 in FIGS. 3a and 3b is represented by the following equation (1), if Y' (jw) = −Y (jw)

$$H(jw) = \frac{X(jw) + Y(jw)}{1 + X(jw) Y(jw)} \quad (1)$$

If X' (jw) = 1/X (jw), the transfer function H (jw) is represented by the following equation (2)

$$H(jw) = \frac{1 + X'(jw) Y(jw)}{X'(jw) + Y(jw)} \quad (2)$$

Therefore, if the transfer coefficient X (jw) or Y (jw) is variable, equation (2) shows a symmetrical variable characteristic so as to satisfy the condition necessary for a variable equalizer.

Figure 3C:
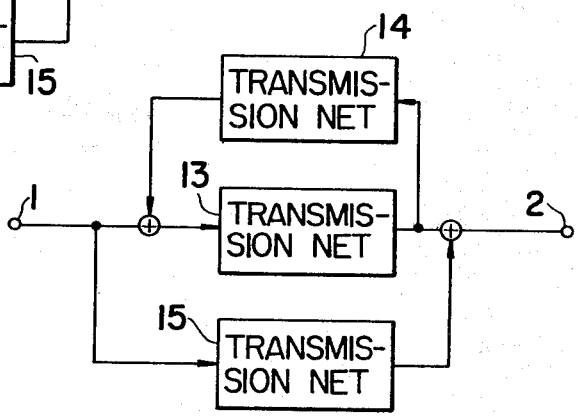
Figure 3D:
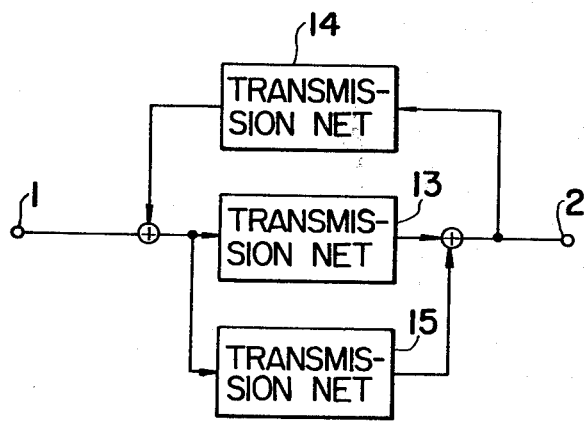

Transfer functions H (jw) in FIGS. 3c and 3d are represented by the following equations (3) and (4), respectively.

$$H(jw) = \frac{X(jw) + Y(jw) - X(jw) Y(jw) Y'(jw)}{1 - X(jw) Y'(jw)} \quad (3)$$

$$H(jw) = \frac{X(jw) + Y(jw)}{1 - X(jw) Y'(jw) - Y(jw) Y'(jw)} \quad (4)$$

Therefore, equations (3) and (4) satisfy the necessary condition for a variable equalizer, if Y (jw) and Y' (jw) are sufficiently small in value and Y (jw) · Y' (jw) is negligible.

In general, the coefficients Y (jw) and Y' (jw) of the feedback and feedforward paths have equal absolute values of the real and imaginary parts thereof and are of opposite polarities [Y (jw) = −Y' (jw)].

Therefore, if network 14 having a coefficient Y (jw) is constituted by a circuit without inductors, network 15 having a coefficient Y' (jw) can be constituted by a circuit including an inverter. Thus, such equalizers as shown in FIGS. 3a to 3d include no inductor.

The coefficient Y (jw) of the feedback path may differ slightly from the coefficient Y' (jw) of the feedforward path in the absolute values of the real and imaginary parts thereof; in the case of such circuits as shown in FIGS. 3c and 3d, for example. The embodiments of the detailed structure of the variable equalizers shown in FIGS. 3a to 3d are explained below.

In such embodiments, although the circuits are shown for A.C. voltages, power source means such as bias voltage sources may be used.

Figure 4:
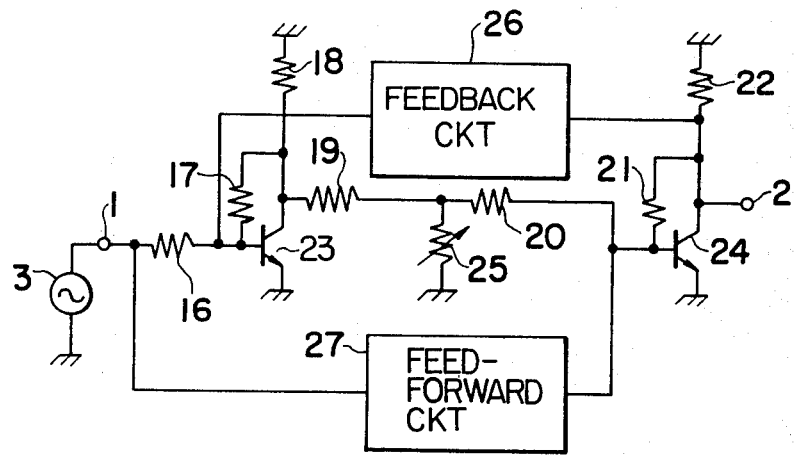

FIG. 4 shows one embodiment of the variable equalizer shown in FIG. 3a.

In FIG. 4, reference numerals 16 through 22 represent fixed resistors, 23 and 24 transistors, 25 a variable resistor, 26 a feedback circuit and 27 a feedforward circuit.

The feedback circuit 26 and the feedforward circuit 27 correspond to networks 14 and 15 in FIG. 3a, respectively, and have fixed transfer coefficients.

The resistor 16 is connected to the input terminal 1 and the base of transistor 23. The collector of transistor 23 is connected through resistor 17 to the base thereof and is grounded through resistor 18.

A circuit corresponding to network 13 in FIG. 3a comprises the fixed resistor 19 and the variable resistor 25 and has a variable transfer coefficient. Specifically, resistor 19 is connected to the collector of transistor 23 and one terminal of resistor 20, the other terminal of resistor 20 being connected to the base of transistor 24. The variable resistor 25 is connected to a connection point between resistors 19 and 20 and ground. The collector of transistor 24 is connected through resistor 21 to the base thereof and is also connected to the output terminal 2.

Furthermore, the collector thereof is grounded through resistor 22. The feedback circuit 26 is connected to the collector of transistor 24 and the base of transistor 23, and the feedforward circuit 27 is connected to the input terminal 1 and the base of transistor 24. The emitters of transistors 23 and 24 are grounded. Although the circuit in FIG. 4 is shown for A.C. voltages, as described above, appropriate D.C. bias sources for the transistors 23 and 24 may be employed.

That is, the series circuit of transistor 23, resistor 18 and ground includes a power source, and the series circuit of transistor 24, resistor 22 and ground also includes a power source. Such power sources which drive the transistors are used similarly in the circuit shown in the other Figures.

In the circuit in FIG. 4, an input signal from the input terminal is added to a feedback signal from the feedback circuit 26 at the base of transistor 23. Since a signal current flows through resistor 17, a signal corresponding to a sum signal of the input signal and the feedback signal is obtained as a voltage at the collector of transistor 23.

The amplitude of the sum signal is changed by a network comprising resistors 19 and 25 and having a variable transfer coefficient. A feedforward signal from the feedforward circuit 27 is added to the signal from the above-mentioned network at the base of transistor 24. Since a signal current flows through resistor 21, an output signal corresponding to the sum signal of the feedforward signal and the signal from the network is obtained from the output terminal 2. Since the network has a variable transfer coefficient, a dual gate field effect transistor can be used in lieu of resistors 19 anf and The feedback circuit 26 and the feedforward circuit 27 can use circuits of the same structure.

Figure 5:
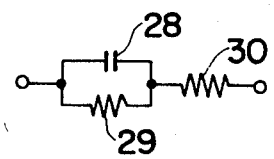
FIGS. 5 and 6 are diagrams showing embodiments of a portion of the variable equalizer shown in FIG. 4.
Figure 6:
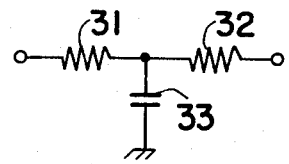

In order to realize such a characteristic as is shown in FIG. 1, in which the variation of the output gain or loss is increased by increasing the frequency, such a circuit as is shown in FIG. 5 can be used for each of circuits 26 and 27. On the other hand, in order to realize the characteristic in which the variation of the gain or loss is reduced by increasing the frequency, such a circuit as is shown in FIG. 6 can be used for each of circuits 26 and 27. In FIG. 5, 28 represents a capacitor and 29 and 30 represent fixed resistors. A parallel circuit of the capacitor 28 and resistor 29 is connected in series with resistor 30.

In FIG. 6, 31 and 32 represent fixed resistors and 33 represents a capacitor. The resistors 31 and 32 are connected in series. The connection point between the resistors 31 and 32 is grounded through the capacitor 33.

In FIG. 4, the variable transmission characteristic is realized by the adjustment of only one variable resistor, that is, resistor 25.

Figure 7:
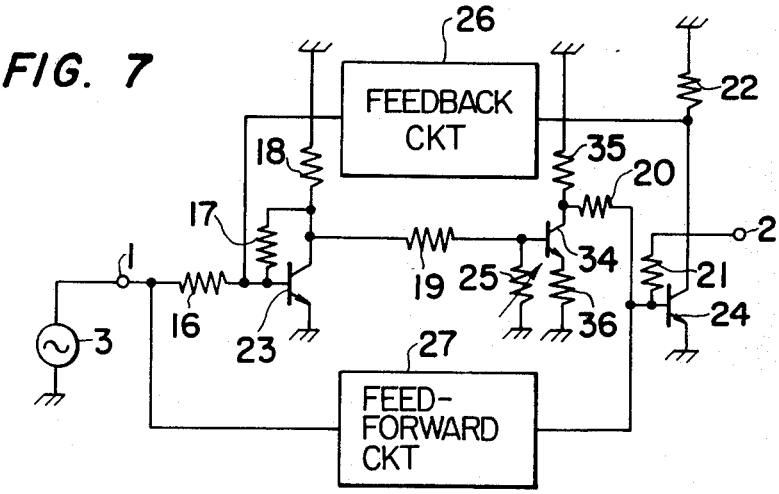

FIG. 7 shows another embodiment of the variable equalizer shown in FIG. 3a. In FIG. 7, 34 represents a transistor and 35 and 36 are fixed resistors. The base of transistor 34 is connected to the connection point between resistors 19 and 25 and the emitter thereof is grounded through resistor 36. The collector of transistor 34 is connected to one terminal of resistor 20 and is grounded through resistor 35. The other portion of the circuit in FIG. 7 is the same as FIG. 4.

Figure 8:
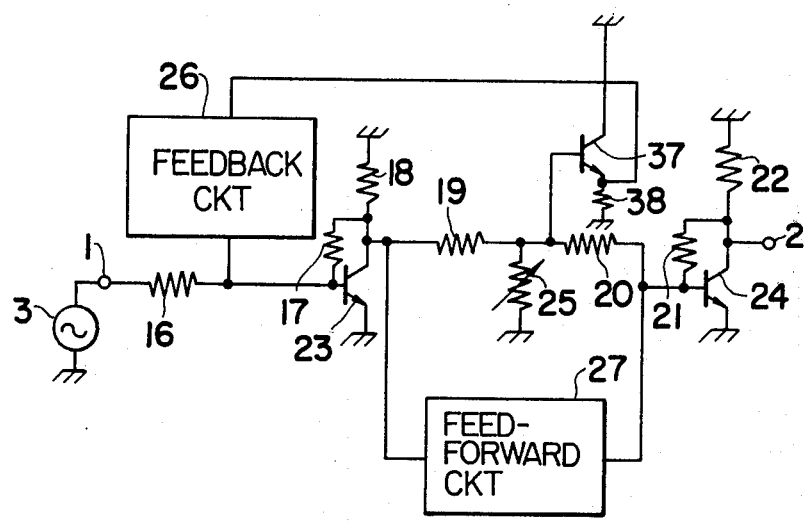
FIGS. 8 and 9 are diagrams showing the detailed structure of embodiments of the variable equalizer shown in FIG. 3b.

FIG. 8 shows one embodiment of the variable equalizer shown in FIG. 3b. In FIG. 8, 37 represents a transistor and 38 represents a fixed resistor.

Features different from FIG. 4 are as follows. The base of transistor 37 is connected to the connection point between resistors 19 and 25 and the collector thereof is directly grounded. The emitter thereof is further grounded through resistor 38. The feedback circuit 26 is connected to the emitter of transistor 37 and the base of transistor 23 and the feedforward circuit 27 is connected to the collector of transistor 23 and the base of transistor 24. The operation of the circuit in FIG. 8 is appropriately the same as that of the circuit shown in FIG. 4.

Figure 9:
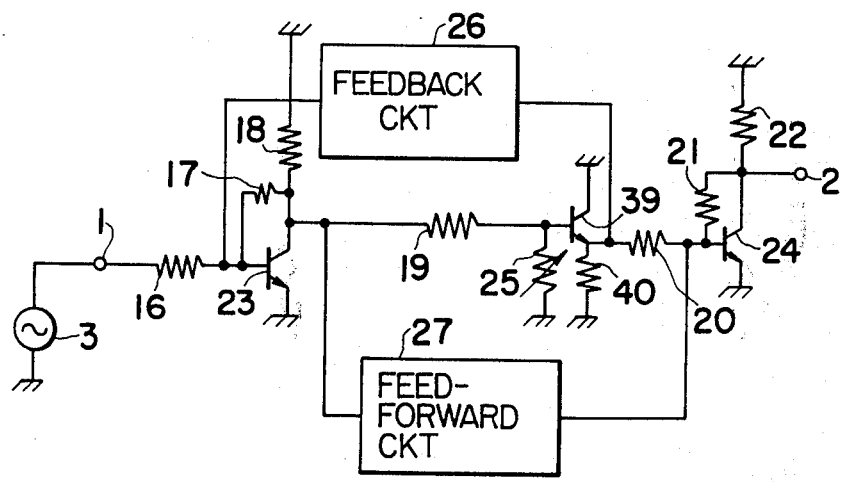

FIG. 9 shows another embodiment of the variable equalizer shown in FIG. 3b. In FIG. 9, 39 and 40 represent a transistor and a resistor, respectively. The base of transistor 39 is connected to the connection point between resistors 19 and 25 and the emitter thereof is connected to one terminal of resistor 20 and is grounded through resistor 40. The collector of transistor 39 is grounded. The feedback circuit 26 is connected to the emitter of transistor 40 and the base of transistor 23. The other portion of the circuit shown in FIG. 9 is nearly the same as that in FIG. 8.

Figure 10:
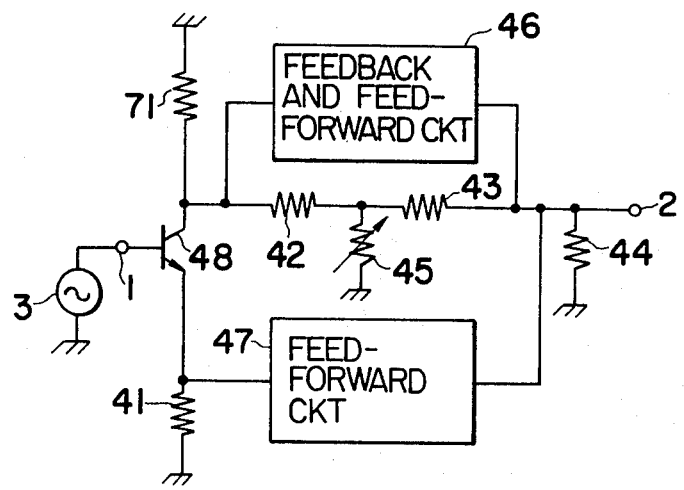
FIG. 10 is a diagram showing the detailed structure of an embodiment of a modified variable equalizer according to this invention.

FIG. 10 shows the detailed structure of another embodiment of a variable equalizer according to this invention. It corresponds to a modification of the variable equalizers shown in FIGS. 3c and 3d. In FIG. 10, 41 through 44 and 71 represent fixed resistors; 45, a variable resistor; 46, a feedback and feedforward circuit; 47, a feedforward circuit; and 48, a transistor. The base of transistor 48 is connected to the input terminal 1, while the collector and the emitter thereof are gounded through resistors 71 and 41, respectively.

A series circuit of resistors 42 and 43 is connected to the collector of transistor 48 and the output terminal 2. The connection point between resistors 42 and 43 is grounded through variable resistor 45.

The feedback and feedforward circuit 46 is connected to the collector of transistor 48 and the output terminal 2 and the feedforward circuit 47 is connected to the emitter of transistor 48 and the output terminal 2. In FIG. 10, circuit 46 has both feedback and feedforward functions. The feedforward function is cancelled by the feedforward circuit 47. Thus, the structure of circuit 46 differs from that of circuit 47.

Figure 11:
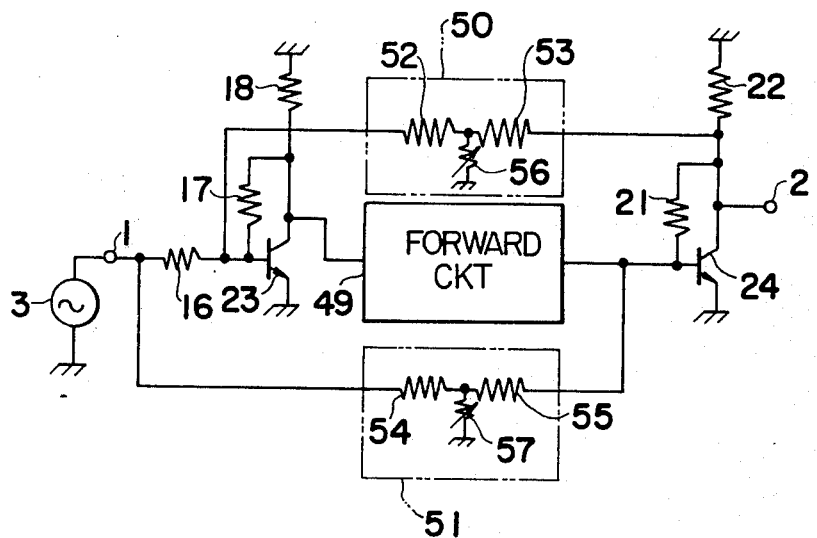
FIG. 11 and FIG. 12 are diagrams showing the detailed structure of other embodiments of the variable equalizers shown in FIGS. 3a and 3b, respectively.

FIG. 11 shows another embodiment of the variable equalizer shown in FIG. 3a. In FIG. 11, 49 represents a forward circuit having a fixed transfer coefficient; 50 and 51, feedback and feedforward circuits, respectively, each having a variable transfer coefficient; 52 through 55, fixed resistors; and 56 and 57, variable resistors.

The forward circuit 49 with a fixed transfer coefficient is connected to the collector of transistor 23 and the base of transistor 24. The feedback circuit 50 with a variable transfer coefficient is connected to the collector of transistor 24 and the base of transistor 23. Furthermore, the feedforward circuit 51 with a variable transfer coefficient is connected to the input terminal 1 and the base of transistor 24. The structure and the operation of the circuit shown in FIG. 11 are the same as those of FIG. 4.

Figure 12:
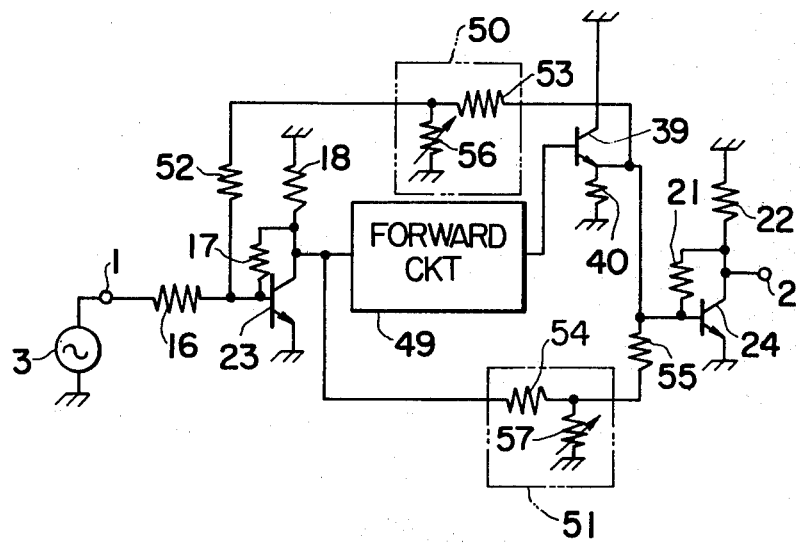

FIG. 12 shows another embodiment of the variable equalizer shown in FIG. 3b. In FIG. 12, the forward circuit 49 with a fixed transfer coefficient is connected to the collector of transistor 23 and the base of transistor 39. The feedback circuit 50 with a variable transfer coefficient is connected to the emitter of transistor 39 and the base of transistor 23. Furthermore, the feedforward circuit 51 with a variable transfer coefficient is connected to the collector of transistor 23 and the base of transistor 24.

The structure and operation of the circuit shown in FIG. 12 are the same to those of FIG. 9.

Figure 13:
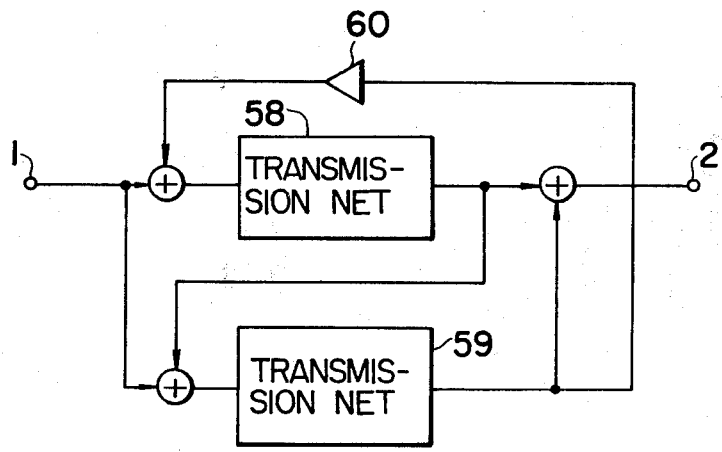
FIGS. 13 and 14 are diagrams showing the fundamental structure of other embodiments of a variable equalizers according to the invention.

FIG. 13 shows the fundamental structure of a modification of the variable equalizers shown in FIGS. 3a to 3d. In FIG. 13, 58 and 59 represent transmission networks, each of which comprises a one-port network, a two-port network or a two-port network with a common grounded terminal, and 60, an inverter circuit. If the transfer coefficients of networks 58 and 59 are X (jw) and Y (jw) respectively, the transfer function H (jw) of FIG. 13 is represented by the above-described equations (1) and (2). Therefore, the transfer function represents a symmetrical variable characteristic so as to satisfy the condition necessary for a variable equalizer.

Figure 14:
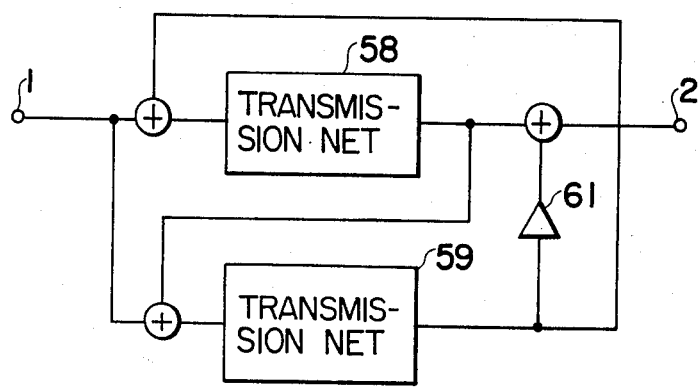

FIG. 14 shows the fundamental structure of another modification of the variable equalizers shown in FIGS. 3a to 3d. In FIG. 14, 61 represents an inverter. The transfer function H (jw) of FIG. 14 is given by the following equation (5).

$$H(jw) = \frac{X(jw) - Y(jw)}{1 - X(jw) \cdot Y(jw)} \qquad (5)$$

Therefore, the transfer function H (jw) satisfies the condition necessary for a variable equalizer.

Figure 15:
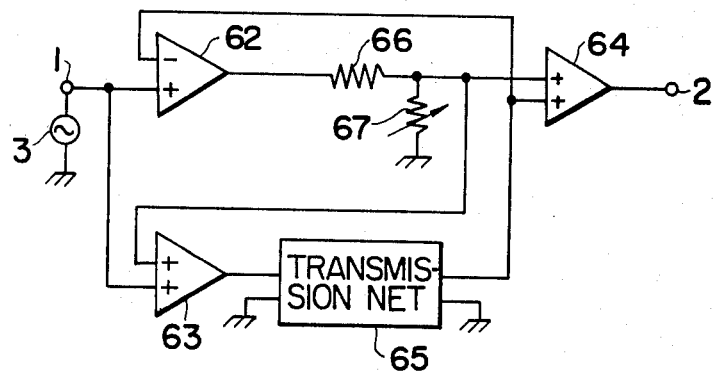
FIG. 15 is a diagram showing the detailed structure of an embodiment of the variable equalizer shown in FIG. 13.

FIG. 15 shows one embodiment of the variable equalizer shown in FIG. 13. In FIG. 15, 62 represents a subtracting circuit; 63 and 64, adding circuits; 65, a circuit corresponding to network 59 in FIG. 13; 66, a fixed resistor; and 67, a variable resistor.

A circuit comprising resistors 66 and 67 corresponds to network 58 in FIG. 13. The input terminal 1 is connected to one of the input terminals of the subtracting circuit 62 and of adding circuit 63. Resistor 66 is connected to an output terminal of the subtracting circuit 62 and one input terminal of adding circuit 64. The input terminal of adding circuit 64 is grounded through resistor 67.

Circuit 65 is connected to an output terminal of adding circuit 63 and the other input terminal of adding circuit 64. The other input terminal of adding circuit 64 is further connected to the other input terminal of the subtracting circuit 62. An output terminal of adding circuit 64 is connected to the output terminal 2. In such an event, a signal from circuit 65 is subtracted from the input signal at the input terminal 1 via the subtracting circuit 62. A difference signal from the subtracting circuit 62 is applied through the circuit comprising the resistors 66 and 67 to the adding circuit 63 and 64. The input signal from the input terminal 1 is added to the difference signal from the subtracting circuit 62 by adding circuit 63. The sum signal from adding circuit 63 is applied through circuit 65 to adding circuit 64 snd the subtracting circuit 62. A signal from circuit 65 is added to a signal from the circuit comprising the resistors 66 and 67 by adding circuit 64. The sum signal from adding circuit 64 is applied to the output terminal 2.

Figure 16:
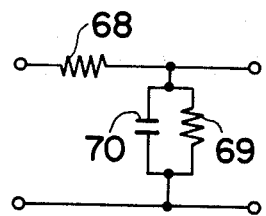
FIG. 16 is a diagram showing an embodiment of a portion of the circuit shown in FIG. 15.

FIG. 16 shows the detailed structure of an embodiment of circuit 65. In FIG. 16, 68 and 69 represent fixed resistors, and 70 is a capacitor. If assumed that values of resistors 68 and 69 are R1 and R2, respectively, and the value of the capacitor 70 is C1, transfer coefficient Y (jw) of FIG. 16 is represented with the following equation (6).

$$Y(jw) = \frac{R_1(R_1 + 2R_2) + (wC_1R_1R_2)^2}{(R_1 + 2R_2)^2 + (wC_1R_1R_2)^2} \qquad (6)$$

We claim:
1. A variable equalizer comprising:
an input terminal to which an input signal is applied;
an output terminal from which an output signal is derived;
a first transmission network provided in the forward path from said input terminal to said output terminal;
a second transmission network provided in the feedback path from said output terminal to said input terminal; and
a third transmission network provided in the feedforward path from said input terminal to said output terminal, wherein
said first transmission network has a frequency independent transfer coefficient and said second and third transmission networks have respective frequency dependent transfer coefficients which are nearly equal in absolute value and are of opposite polarities with respect to each other.

2. A variable equalizer according to claim 1, in which said first transmission network has a variable transfer coefficient and said second and third transmission networks have respective fixed transfer coefficients.

3. A variable equalizer comprising:
an input terminal to which an input signal is applied;
an output terminal from which an output signal is derived;
a forward path from said input terminal to said output terminal including a forward circuit;
a feedback path from said output terminal to said input terminal including a feedback circuit; and
a feedforward path from said input terminal to said output terminal, including a feedforward circuit, wherein
said forward circuit has a frequency independent transfer coefficient and said feedback and feedforward circuits have respective frequency dependent transfer coefficients which are nearly equal in absolute value and are of opposite polarities with respect to each other 4. A variable equalizer comprising:
an input terminal to which an input signal is applied;
an output terminal from which an output signal is derived;
a feedforward circuit to which the input signal from said input terminal is applied;
a feedback circuit to which the output signal is applied;
first adding means for adding a signal from signal- from said feedback circuit to the input signal from said input terminal;
a forward circuit to which a first sum signal from said first adding means is applied; and
second adding means for adding a feedforward signal from said feedforward circuit to a forward signal from said forward circuit, the second sum signal from said second adding means being applied to said output terminal as the output signal, wherein said forward circuit has a frequency independent transfer coefficient and said feedforward and feedback circuits have respective frequency dependent transfer coefficients which are nearly equal in absolute value and are of opposite polarity with respect to each other.

5. A variable equalizer according to claim 4, in which said forward circuit has a variable transfer coefficient and said feedback circuit and said feedforward circuit have respective fixed transfer coefficients.

6. A variable equalizer comprising:
an input terminal to which an input signal is applied;
an output terminal from which an output signal is derived;
a feedback circuit;
first adding means for adding a feedback signal from said feedback circuit to the input signal from said input terminal;
a forward circuit to which a first sum signal from said first adding means is applied;
a feedforward circuit to which the first sum signal from said first adding means is applied;
second adding means for adding a feedforward signal from said feedforward circuit to a forward signal from said forward circuit, the second sum signal from said second adding means being applied to said output terminal as the output signal; and
means for applying the forward signal from said forward circuit to said feedback circuit, wherein said forward circuit has a frequency independent transfer coefficient and said feedforward and feedback circuits have respective frequency dependent transfer coefficients which are nearly equal in absolute value and are of opposite polarity with respect to each other.

7. A variable equalizer according to claim 6, in which said forward circuit has a variable transfer coefficient and said feedback circuit and said feedforward circuit have respective fixed transfer coefficients.

8. A variable equalizer comprising:
an input terminal to which an input signal is applied;
an output terminal from which an output signal is derived;
a feedforward circuit to which the input signal from said input terminal is applied;
a feedback circuit;
first adding means for adding a feedback signal from said feedback circuit to the input signal from said input terminal;
a forward circuit to which a first sum signal from said first addng means is applied;
means for applying a forward signal from said forward circuit to said feedback circuit; and
second adding means for adding a feedforward signal from said feedforward circuit to the forward signal from said forward circuit, the second sum signal from said second adding means being applied to said output terminal as the output signal, wherein
said forward circuit has a frequency independent transfer coefficient and said feedforward and feedback circuits have respective frequency dependent transfer coefficients which are nearly equal in absolute value and are of opposite polarity with respect to each other.

9. A variable equalizer comprising:
an input terminal to which an input signal is applied;
an output terminal from which an output signal is derived;
a feedback circuit to which the output signal is applied;

first adding means for adding a feedback signal from said feedback circuit to the input signal from said input terminal;

a forward circuit and a feedforward circuit, to each of which a first sum signal from said first adding means is applied; and second adding means for adding a feedforward signal from said feedforward circuit to a forward signal from said forward circuit, a second sum signal from said second adding means being applied to said output terminal as the output signal, wherein said forward circuit has a frequency independent transfer coefficient and said feedforward and feedback circuit have respective frequency dependent transfer coefficients which are nearly equal in absolute value and are of opposite polarity with respect to each other.

10. A variable equalizer comprising:
an input terminal to which an input signal is applied;
an output terminal from which an output signal is derived;
first transistor circuit having a feedback loop, the input side of which is connected to said input terminal;
second transistor circuit having a feedback loop, the output side of which is connected to said output terminal;
a forward circuit connected between the output side of said first transistor circuit and the input side of said second transistor circuit and having a variable transfer coefficient independent of the frequency;
a feedforward circuit connected between said input terminal and the input side of said second transistor circuit and having a fixed frequency dependent transfer coefficient; and
a feedback circuit connected between the output side of said second transfer circuit and the input side of said first transistor circuit and having a fixed frequency dependent transfer coefficient which is nearly equal in absolute value to the coefficient in said feedforward circuit and is of a polarity opposite to that of said feedforward circuit.

11. A variable equalizer comprising:
an input terminal to which an input signal is applied;
an output terminal from which an output signal is derived;
a first transistor circuit having a feedback loop, the input side of which is connected to said input terminal;
a second transistor circuit having a feedback loop the output side of which is connected to said output terminal;
a forward circuit connected between the output side of said transistor circuit and the input side of said second transistor circuit and having a variable transfer coefficient;
a feedforward circuit connected between said input terminal and input side of said second transistor circuit and having a fixed transfer coefficient; and
a feedback circuit connected between the output side of said second transistor circuit and the input side of said first transistor circuit and having a fixed transfer coefficient of a polarity opposite to that of said feedforward circuit, wherein
each of said first and second transistor circuits comprises a transistor having a base electrode, an emitter electrode, and a collector electrode, the feedback loop of which comprises a resistor connected between the base and collector electrode, the output of each of said first and second transistor circuits being taken from the collector electrode, and the input of each of said first and second transistor circuits being applied to the base electrode.

12. A variable equalizer according to claim 11, wherein said forward circuit comprises a resistor network which includes a variable resistor therein.

13. A variable equalizer according to claim 12, wherein each of said feedback circuit and said feedforward circuits comprise a series connection of a first resistor in series with a parallel circuit of a capacitor and a second resistor.

14. A variable equalizer according to claim 12, wherein each of said feedback circuit and said feedforward circuit comprises a series connection of first and second resistors, the common connection of which is connected through a capacitor to a source of reference potential.

15. A variable equalizer comprising:
an input terminal to which an input signal is applied;
an output terminal from which an output signal is derived;
first transistor circuit having a feedback loop, the input side of which is connected to said input terminal;
a second transistor circuit having a feedback loop, the output side of which is connected to said output terminal;
third transistor circuit, the input side of which is connected to the input side of said second transistor circuit;
a forward circuit connected between the output side of said first transistor circuit and the input side of said second transistor circuit and having a variable transfer coefficient;
a feedback circuit connected between the output side of said third transistor circuit and the input side of said first transistor circuit and having a fixed transfer coefficient; and
a feedforward circuit connected between the output side of said first transistor circuit and the input side of said second transistor circuit and having a fixed transfer coefficient of a polarity opposite to that of said feedback circuit.

16. A variable equalizer according to claim 15, wherein each of said first and second transistor circuits comprises a transistor having a base electrode, an emitter electrode, and a collector electrode, the feedback loop of which comprises a resistor connected between the base and collector electrode, the output of each of said first and second transistor circuits being taken from the collector electrode, and the input of each of said first and second transistor circuits being applied to the base electrode.

17. A variable equalizer according to claim 16, wherein said forward circuit comprises a resistor network which includes a variable resistor therein.

18. A variable equalizer comprising:
an input terminal to which an input signal is applied;
an output terminal from which an output signal is derived;
a transistor circuit having an input electrode connected to said input terminal and first and second output electrodes;
a first transmission network connected between said first output electrode of said transistor circuit and said output terminal and having a variable transfer coefficient independent of the frequency;

a second transmission network connected to said output terminal and said first output electrode of said transistor circuit and having a fixed frequency dependent transfer coefficient; and a third transmission network connected between said second output electrode of said transistor circuit and said output terminal and having a fixed frequency dependent transfer coefficient which is nearly equal in absolute value to the coefficient in said second transmission network and is of a polarity opposite to that of said second transmission network 19. A variable equalizer comprising;
an input terminal to which an input signal is applied;
an output terminal from which an output signal is derived;
a first transmission network;
first adding means for adding a signal from said first transmission network to the input signal from said input terminal;
a second transmission network to which a first sum signal from said first adding means is applied;
second adding means for adding a signal from said second transmission network to the signal from said first transmission network, a second sum signal from said second adding means being applied to said output terminal as the output signal;
inverter means for inverting the signal from said second transmission network; and
third adding means for adding an inverted signal from said inverter means to the input signal from said input terminal, a third sum signal from said third adding means being applied to said first transmission network.

20. A variable equalizer comprising:
an input terminal to which an input signal is applied;
an output terminal from which an output signal is derived;
a first transmission network;
first adding means for adding a signal from said first transmission network to the input signal from said input terminal;
a second transmission network to which a first sum signal from said first adding means is applied;
inverter means for inverting a signal from said second transmission network;
second adding means for adding an inverted signal from said inverter means to the signal from said first transmission network, a second sum signal from said second adding means being applied to said output terminal as the output signal; and
third adding means for adding the signal from said second transmission network to the input signal from said input terminal, a third sum signal from said third adding means being applied to said first transmission network.

21. A variable equalizer comprising:
an input terminal to which an input signal is applied;
an output terminal from which an output signal is derived;
a first transmission network having a variable transfer coefficient;
a first adding circuit for adding a signal from said first transmission network to the input signal from said input terminal;
a second transmission network to which a first sum signal from said first adding circuit is applied and which has a fixed transfer coefficient;
a second adding circuit for adding a signal from said second transmission network to the signal from said first transmission network, a second sum signal from said second adding circuit being applied to said output terminal as the output signal; and
a subtracting circuit for subtracting the signal from said second transmission network from the input signal, a difference signal from said subtracting circuit being applied to said first transmission network.

22. A variable equalizer according to claim 21, wherein said second transmission network comprises first and second inputs and first and second outputs,
a first resistor connected between said first input and said first output, and
a parallel circuit of a capacitor and a second resistor connected between said first output and the common connection of said second input and said second output.

23. A variable equalizer comprising:
an input terminal to which an input signal is applied;
an output terminal from which an output signal is derived;
a first transmission network having a transfer coefficient $X(jw)$ provided in the forward path connecting said input terminal to said output terminal;
a second transmission network having a transfer coefficient $Y(jw)$ for feeding the output of said first transmission network back to the input side thereof, and being coupled to the forward path in such a manner that the sum of said input signal from the input terminal and the output of the second transmission network can be applied to said first transmission network; and
a third transmission network having a transfer coefficient $Y'(jw)$, opposite in polarity and substantially equal in absolute value to said transfer coefficient $Y(jw)$, and being coupled to said forward path in such a manner that the sum of the outputs of said first and third transmission networks can be derived from said output terminal.

24. A variable equalizer according to claim 23, in which said first transmission network has a frequency independent transfer coefficient.

25. A variable equalizer according to claim 23, in which at least one transmission network has a variable transfer coefficient.

* * * * *